(12) United States Patent
Wang et al.

(10) Patent No.: US 12,223,969 B2
(45) Date of Patent: Feb. 11, 2025

(54) TRAINING METHOD AND DEVICE FOR AUDIO SEPARATION NETWORK, AUDIO SEPARATION METHOD AND DEVICE, AND MEDIUM

(71) Applicant: TENCENT TECHNOLOGY (SHENZHEN) COMPANY LIMITED, Guangdong (CN)

(72) Inventors: Jun Wang, Shenzhen (CN); Wing Yip Lam, Shenzhen (CN); Dan Su, Shenzhen (CN); Dong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 319 days.

(21) Appl. No.: 17/682,399

(22) Filed: Feb. 28, 2022

(65) Prior Publication Data

US 2022/0180882 A1 Jun. 9, 2022

Related U.S. Application Data

(63) Continuation of application No. PCT/CN2020/126492, filed on Nov. 4, 2020.

(30) Foreign Application Priority Data

Feb. 11, 2020 (CN) ......................... 202010086752.X

(51) Int. Cl.
*G10L 19/06* (2013.01)
*G06N 3/045* (2023.01)
(Continued)

(52) U.S. Cl.
CPC .............. *G10L 19/06* (2013.01); *G06N 3/045* (2023.01); *G06N 3/088* (2013.01); *G10L 25/30* (2013.01)

(58) Field of Classification Search
CPC ..... G10L 19/06; G10L 25/30; G10L 21/0272; G06N 3/045; G06N 3/088
See application file for complete search history.

(56) References Cited

U.S. PATENT DOCUMENTS 10,147,442 B1 12/2018 Panchapagesan et al.
2011/0231185 A1* 9/2011 Kleffner .............. G10L 21/0272
704/226
(Continued)

FOREIGN PATENT DOCUMENTS

CN 107203777 A 9/2017
CN 109544190 A 3/2019
(Continued)

OTHER PUBLICATIONS

Extended European Search Report dated Oct. 20, 2022 in European Application No. 20918512.3.
(Continued)

*Primary Examiner* — Michael N Opsasnick
(74) *Attorney, Agent, or Firm* — Sughrue Mion, PLLC

(57) ABSTRACT

A method of training an audio separation network is provided. The method includes obtaining a first separation sample set, the first separation sample set including at least two types of audio with dummy labels, obtaining a first sample set by performing interpolation on the first separation sample set based on perturbation data, obtaining a second separation sample set by separating the first sample set using an unsupervised network, determining losses of second separation samples in the second separation sample set, and adjusting network parameters of the unsupervised network based on the losses of the second separation samples, such that a first loss of a first separation result outputted by an adjusted unsupervised network meets a convergence condition.

17 Claims, 5 Drawing Sheets

FIG. 5A

(51) Int. Cl.
*G06N 3/088* (2023.01)
*G10L 25/30* (2013.01)

(56) References Cited

U.S. PATENT DOCUMENTS

| | | | | |
|---|---|---|---|---|
| 2015/0025881 | A1* | 1/2015 | Carlos | G10L 21/0272 |
| | | | | 704/233 |
| 2016/0241346 | A1* | 8/2016 | Hoffman | G10L 21/0224 |
| 2017/0162194 | A1* | 6/2017 | Nesta | G10L 25/30 |
| 2018/0115855 | A1* | 4/2018 | Bakish | H04R 1/265 |
| 2021/0201159 | A1* | 7/2021 | Song | G06N 3/045 |

FOREIGN PATENT DOCUMENTS

| | | |
|---|---|---|
| CN | 110070882 A | 7/2019 |
| CN | 110120227 A | 8/2019 |
| CN | 110600018 A | 12/2019 |
| CN | 110634502 A | 12/2019 |
| CN | 111341341 A | 6/2020 |

OTHER PUBLICATIONS

Max W. Y. Lam et al., Mixup-Breakdown: A Consistency Training Method for Improving Generalization of Speech Separation Models, 2019, (6 pages total).
Scott Wisdom et al., "Unsupervised Sound Separation Using Mixtures of Mixtures", 2020, pp. 1-14 (14 pages total).
International Search Report for PCT/CN2020/126492 dated Feb. 9, 2021 [PCT/ISA/210].
Written Opinion for PCT/CN2020/126492 dated Feb. 9, 2021 [PCT/ISA/237].
Chinese Office Action for 202010086752X dated Mar. 3, 2021.
Chinese Office Action for 202010086752X dated Apr. 26, 2021.

* cited by examiner

TRAINING METHOD AND DEVICE FOR AUDIO SEPARATION NETWORK, AUDIO SEPARATION METHOD AND DEVICE, AND MEDIUM

CROSS REFERENCE TO RELATED APPLICATION(S)

This application is a continuation application of International Application No. PCT/CN2020/126492, filed on Nov. 4, 2020, which claims priority to Chinese Patent Application No. 202010086752.X, filed with the China National Intellectual Property Administration on Feb. 11, 2020, the entire contents of which are incorporated by reference herein.

FIELD

The disclosure relates generally to the field of machine learning, and in particular, to a method for training an audio separation network and an audio separation method, an apparatus, and a storage medium.

BACKGROUND

Due to the poor generalization capability of speech separation networks based on deep learning, when training speech does not match test speech, even the most advanced speech separation network may suddenly fail to evaluate the test speech. Usually, limited by time, manpower, and cost, it is often impractical to collect large-scale, wide-ranging, and sufficiently diverse labeled training data. Consequently, the lack of labeled data may lead to overfitting and a poor generalization capability of a complex network with a large number of parameters.

SUMMARY

Provided are a method for training an audio separation network, an audio separation method, an apparatus, and a storage medium, and may use a first sample set as samples for training an unsupervised network, which may enrich sample data of the unsupervised network and enhance a generalization capability of the unsupervised network.

According to an aspect of the disclosure, a method of training an audio separation network may include obtaining a first separation sample set, the first separation sample set including at least two types of audio with dummy labels, obtaining a first sample set by performing interpolation on the first separation sample set based on perturbation data, obtaining a second separation sample set by separating the first sample set using an unsupervised network, determining losses of second separation samples in the second separation sample set, and adjusting network parameters of the unsupervised network based on the losses of the second separation samples, such that a first loss of a first separation result outputted by an adjusted unsupervised network meets a convergence condition.

According to an aspect of the disclosure, an apparatus for training an audio separation network may include at least one memory configured to store computer program code, and at least one processor configured to access said computer program code and operate as instructed by said computer program code, said computer program code including first obtaining code configured to cause the at least one processor to obtain a first separation sample set, the first separation sample set including at least two types of audio with dummy labels, second obtaining code configured to cause the at least one processor to obtain a first sample set by performing interpolation on the first separation sample set based on perturbation data, third obtaining code configured to cause the at least one processor to obtain a second separation sample set by separating the first sample set using an unsupervised network, first determining code configured to cause the at least one processor to determine losses of second separation samples in the second separation sample set, and first adjusting code configured to cause the at least one processor to adjust network parameters of the unsupervised network based on the losses of the second separation samples, such that a first loss of a first separation result outputted by an adjusted unsupervised network meets a convergence condition.

According to an aspect of the disclosure, a non-transitory computer-readable storage medium may store computer instructions that, when executed by at least one processor of a device, cause the at least one processor to obtain a first separation sample set, the first separation sample set including at least two types of audio with dummy labels, obtain a first sample set by performing interpolation on the first separation sample set based on perturbation data, obtain a second separation sample set by separating the first sample set using an unsupervised network, determine losses of second separation samples in the second separation sample set, and adjust network parameters of the unsupervised network based on the losses of the second separation samples, such that a first loss of a first separation result outputted by an adjusted unsupervised network meets a convergence condition.

According to a second aspect, an embodiment of this disclosure provides an audio separation method, applicable to an audio separation device, the method including:
  obtaining to-be-separated audio;
  separating the to-be-separated audio by using a trained neural network, to obtain a separation result, where the neural network is obtained through training based on the foregoing method for training an audio separation network; and
  outputting the separation result.

According to a third aspect, an embodiment of this disclosure provides an apparatus for training an audio separation network, including:
  a first obtaining module, configured to obtain a first separation sample set, the first separation sample set at least including two types of audio with dummy labels;
  a first interpolation module, configured to perform interpolation on the first separation sample set by using perturbation data, to obtain a first sample set;
  a first separation module, configured to separate the first sample set by using an unsupervised network, to obtain a second separation sample set;
  a first determining module, configured to determine losses of second separation samples in the second separation sample set; and
  a first adjustment module, configured to adjust network parameters of the unsupervised network by using the losses of the second separation samples, such that a loss of a separation result outputted by an adjusted unsupervised network meets a convergence condition.

According to a fourth aspect, an embodiment of this disclosure provides an audio separation apparatus, including:
  a second obtaining module, configured to obtain to-be-separated audio;
  a first input module, configured to separate the to-be-separated audio by using a trained neural network, to obtain a separation result, where the neural network is obtained through training based on the method for training an audio separation network according to the first aspect; and a first output module, configured to output the separation result.

According to a fifth aspect, an embodiment of this disclosure provides a computer storage medium, storing executable instructions, configured to be executed by a processor to implement the method for training an audio separation network according to the first aspect, or be executed by a processor to implement the audio separation method according to the second aspect.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

Figure 1:
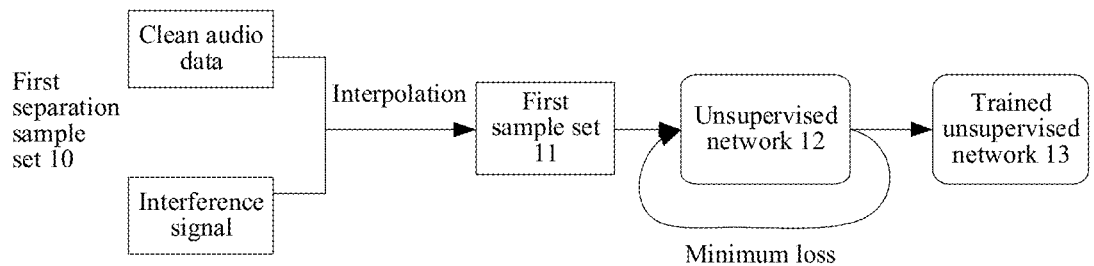
FIG. 1 is a diagram of a system for training an audio separation network according to an embodiment.

To make the objectives, technical solutions, and advantages of this disclosure clearer, the following describes the disclosure in further detail with reference to the accompanying drawings. The described embodiments are not to be considered as a limitation to this disclosure. All other embodiments obtained by a person of ordinary skill in the art without creative efforts shall fall within the protection scope of this disclosure.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this disclosure described herein may be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this disclosure, but are not intended to limit this disclosure.

Before the embodiments of this disclosure are further described in detail, nouns and terms involved in the embodiments of this disclosure are described. The terms provided in the embodiments of this disclosure are applicable to the following explanations.

Automatic speech recognition (ASR) is a technology that converts speech of people into a text. Speech recognition is a multidisciplinary field, which is closely connected with many disciplines such as acoustics, phonetics, linguistics, digital signal processing theory, information theory, and computer science. Due to diversity and complexity of speech signals, speech recognition systems can only obtain satisfactory performance under certain restricted conditions, or can only be applied to certain specific occasions.

Permutation invariant training (PIT) provides a permutation invariant training technology that solves a label permutation problem by minimizing a separation error, where the permutation invariant training technology means that an inputted order change of an input does not affect a value of an output. The PIT calculates target loss functions under all possible output permutations, and selects a corresponding lowest target loss function to determine a correct output arrangement. The PIT is a universal and effective method, and a cost thereof is that complexity may be increased as a dimension of the output increases.

Semi-supervised learning (SSL) is a key issue in the field of mode recognition and machine learning, and is a learning method that combines supervised learning and unsupervised learning. The SSL performs mode recognition by using a large number of unlabeled data and labeled data. When the SSL is used, as few people as possible are required to do the work, and relatively-high correctness may be brought.

Consistent semi-supervised learning may include, first, sampling a minibatch of labeled data; second, sending the labeled data to a network to predict and calculating a cross entropy loss; third, sampling two minibatches of unlabeled data; fourth, sending the unlabeled data to the network to predict labels; fifth, mixing the two unlabeled data; sixth, calculating a mean square error loss predicted in new data after mixing; and seventh, iteratively updating network parameters by adding labeled losses and the mean square error loss, to obtain a final network.

Exponential moving average (EMA) is also referred to as a moving average method. Based on a simple average method, EMA is a method that calculates moving average values by adding and subtracting old and new data in order, to eliminate accidental change factors, the system may identify a development trend of things, and make predictions accordingly. An EMA method is one of trend extrapolation technologies. The EMA method performs curve fitting on data series with an obvious load variation trend, and then uses a new curve to forecast a value at a certain point in the future.

A generative adversarial network (GAN) includes two parts: a generation network and a discrimination network. The generation network refers to generating texts, images, videos, and other data from inputted data through network training according to tasks. The generation network is essentially a type of maximum likelihood estimation, which is used for generating a network of data that a distribution thereof is specified. A function of the generation network is to capture a distribution of sample data, and transform a distribution condition of original input information through parameters in the maximum likelihood estimation to convert a training bias into samples that distributions thereof are specified. The discrimination network is actually a binary classification, and may discriminate data, such as images, generated by the generation network, to discriminate whether the data belongs to data in true training data.

A mean teacher (MT) network includes two networks: a student network and a teacher network. The two networks have the same structure, network parameters of the teacher network are obtained by calculating the student network, and network parameters of the student network are obtained by updating of gradient descent of a loss function. Throughout the training process, the network parameters of the teacher network are obtained by performing EMA on and updating the network parameters of the student network.

Deep clustering (DPCL) refers to application of deep networks in unsupervised data clustering. A process of dividing a set of physical or abstract objects into a plurality of types formed by similar objects is referred to as clustering.

Advances in deep learning-based speech separation methods have led to substantial improvement in state-of-the-art performance tested on several benchmark datasets. Expanded networks based on high-dimensional embedding networks include: deep attraction networks, deep extraction networks, and anchor deep attraction networks. In addition, methods based on PIT are included. The PIT calculates target loss functions under all possible output permutations, and selects a corresponding lowest target loss function to determine a correct output arrangement. The PIT is a universal and effective method, and a cost thereof is that complexity may be increased as a dimension of the output increases.

However, in actual applications, even a most advanced network may fail when these networks are applied to scenarios that the networks do not match types of interference signals during training. That is because large-scale, wide-coverage, and sufficiently diverse training data is required during training a complex neural network with a large number of learnable parameters and making the network have good generalization performance. On the one hand, collection of such high-quality labeled data for speech separation and recognition is expensive, onerous and sometimes impractical. Although automatic augmentation technologies with labeled data have been shown that generalization performance of the networks may be improved, the improvement is limited because these automatic augmentation technologies cannot mine information other than the labeled data, such as information contained in a vast amount of unlabeled data. On the other hand, the vast amount of unlabeled data is relative-easily obtained, but cannot be effectively mined. Therefore, the data is usually ignored by a deep learning-based speech separation and recognition system.

Based on this, the embodiments of this disclosure provide a method for training an audio separation network, an audio separation method, an apparatus, and a storage medium. During training an unsupervised network, a first sample set on which interpolation is performed by using two types of audio with dummy labels and perturbation data is used as samples for training the unsupervised network, which enriches sample data of the unsupervised network and enhances a generalization capability of the unsupervised network.

An exemplary application of a device for training an audio separation network provided in the embodiments of this disclosure is described below. The device provided in the embodiments of this disclosure may be implemented as various types of user terminals such as a notebook computer, a tablet computer, a desktop computer, a set-top box or a mobile device (for example, a mobile phone, a portable music player, a personal digital assistant (PDA), a dedicated messaging device, or a portable game device), or may be implemented as a server. An exemplary application of the device being applied to a terminal or a server is described below. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of this disclosure.

FIG. 1 is a diagram of a system for training an audio separation network according to an embodiment. To support an exemplary embodiment, for an obtained first separation sample set 10 including a plurality of types of audio with dummy labels (at least including two parts: clean audio data and interference signals), interpolation is performed by using perturbation data, to obtain a mixed first sample set 11; then, the first sample set 11 is inputted into an unsupervised network 12, to train the unsupervised network 12; and finally, losses of second separation samples outputted by the unsupervised network 12 are fed back to the network, such that network parameters thereof are adjusted, such that a loss of a separation result outputted by an adjusted unsupervised network meets a convergence condition. In this way, a trained unsupervised network 13 is obtained. In this way, during training an unsupervised network, a first sample set on which interpolation is performed by using two types of audio with dummy labels and perturbation data is used as samples for training the unsupervised network, which enriches sample data of the unsupervised network and enhances a generalization capability of the unsupervised network. When separation of to-be-separated audio 14 is required, the to-be-separated audio 14 is inputted into the trained unsupervised network 13, to obtain a precise separation result 15, and the separation result 15 is outputted. In this way, the to-be-separated audio is separated by using the unsupervised network 13 obtained through training unlabeled sample data, such that correctness of the separation result is improved.

Figure 2A:
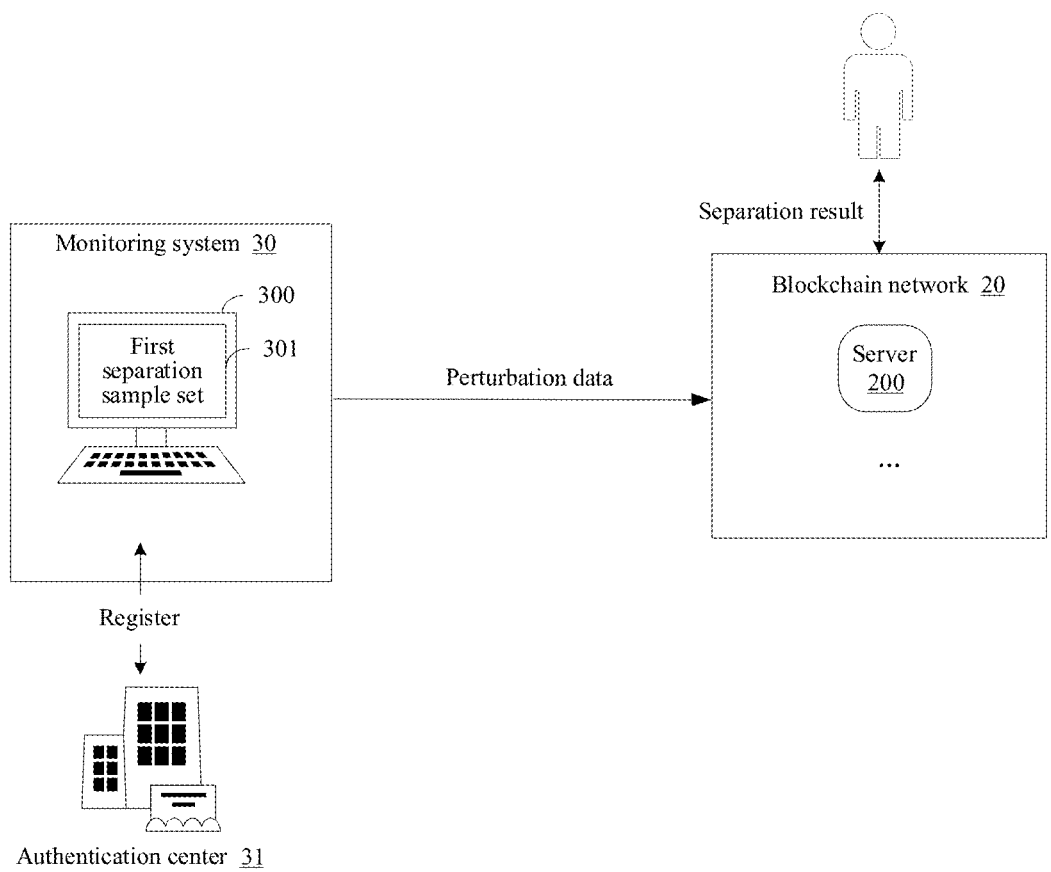
FIG. 2A is a diagram of a system for training an audio separation network according to an embodiment.

FIG. 2A is a diagram of a system for training an audio separation network according to an embodiment. The transaction processing system includes a blockchain network 20 (for example, showing a server 200 as a native node), and a monitoring system 30 (for example, showing a device 300 and a graphical interface 301 thereof that belong to the monitoring system 30), which are separately described below.

A type of the blockchain network 20 is flexible and may be, for example, any one of a public chain, a private chain, or a consortium chain. The public chain is used as an example, electronic devices such as a user device and a server of any service entity may access the blockchain network 20 without authorization. Using the consortium chain as an example, an electronic device (such as a device/ server) managed by a service entity may access the blockchain network 20 after the service entity is authorized. In this case, the electronic device becomes a special node in the blockchain network 20, that is, a client node.

The client node may only provide a function of supporting the service entity in initiating a transaction (for example, used for chaining to store data or querying for on-chain data). For functions of the native node of the blockchain network 20, for example, a sorting function, a consensus service, and a ledger function described below, the client node may implement them by default or selectively (for example, depending on a specific service need of the service entity). In this way, data and service processing logic of the service entity may be migrated to the blockchain network 20 to the greatest extent, and credibility and traceability of the data and service processing processes are implemented through the blockchain network 20.

The blockchain network 20 receives a deal submitted by a client node (for example, the device 300 belonging to the monitoring system 30 shown in FIG. 2A) of a service entity (for example, the monitoring system 30 shown in FIG. 2A), executes the deal to update or query an account book, and displays various intermediate results or final results of the executed deal on a user interface of the device (for example, the graphical interface 301 of the device 300).

The following uses an example in which the monitoring system accesses the blockchain network to implement a higher chain of training of an audio separation network, to describe an exemplary application of the blockchain network.

The device 300 of the monitoring system 30 accesses the blockchain network 20 and becomes a client node of the blockchain network 20. The device 300 obtains a first separation sample set through a sensor. Moreover, the trained unsupervised network is transferred to the server 200 in the blockchain network 20 or stored in the device 300. When upload logic has been deployed for the device 300 or a user performs an operation, the device 300 generates, based on the transaction-to-be-processed/a synchronization time query request, a deal corresponding to an update operation/a query operation, and specifies, in the deal, a smart contract that needs to be invoked to implement the update operation/query operation, and a parameter transferred to the smart contract. The deal also carries a digital signature (for example, obtained by encrypting an abstract of the deal by using a private key in the digital certificate of the monitoring system 30) signed by the monitoring system 30. The deal is broadcasted to the blockchain network 20. The digital certificate may be obtained through registration with an authentication center 31 by the monitoring system 30.

When receiving the deal, the native node such as the server 200 in the blockchain network 20 attempts to verify the digital signature carried by the deal. After the digital signature has been verified, it is determined whether the monitoring system 30 has deal authority based on an identity of the monitoring system 30 that is carried in the deal. Any verification judgment in the digital signature and authority verification may lead to a deal failure. After verification is successful, a digital signature (for example, obtained by encrypting the abstract of the deal by using a private key of the native node) of the native node is signed, and the deal continues to be broadcasted in the blockchain network 20.

After receiving the deal that has been verified, a node with the sorting function in the blockchain network 20 fills the deal into a new block, and broadcasts the deal to a node providing the consensus service in the blockchain network 20.

The node providing the consensus service in the blockchain network 20 performs a consensus process on the new block to reach a consensus, and a node providing the account book function adds the new block to the end of the blockchain and performs the deal in the new block: for a new transaction for training of the audio separation network, key-value pairs corresponding to an outputted evaluation result and evaluation data are updated; for a transaction for querying a synchronization time, a key-value pair corresponding to the synchronization time is queried from a state database and a query result is returned; and the obtained synchronization time may be displayed on the graphical interface 301 of the device 300.

The native node in the blockchain network 20 may read the first separation sample set, and display the first separation sample set on a monitoring page of the native node. The native node may also perform interpolation the first separation sample set, to obtain a mixed first sample set; train an unsupervised network based on the first sample set; and adjust network parameters of the unsupervised network through losses of second separation samples, to obtain two trained neural networks. In this way, the first sample set is used as samples for training the unsupervised network, which enriches the sample data of the unsupervised network and enhances the generalization capability of the unsupervised network.

In actual applications, different functions may be set for different native nodes of the blockchain network 20, for example, the server 200 is set to have a training function and an accounting function for the audio separation network. For example, the server uploads a first separation sample set on a device side for interpolation, to obtain a mixed first sample set; trains an unsupervised network based on the first sample set; and adjusts network parameters of the unsupervised network through losses of second separation samples, to obtain a trained unsupervised network. In this case, in a transaction process, the server 200 may receive a first separation sample set sent by the device 300, and the server 200 may perform interpolation on the first separation sample set, to obtain a mixed first sample set; train an unsupervised network based on the first sample set; and adjust network parameters through losses of second separation samples, to obtain a trained unsupervised network.

Figure 2B:
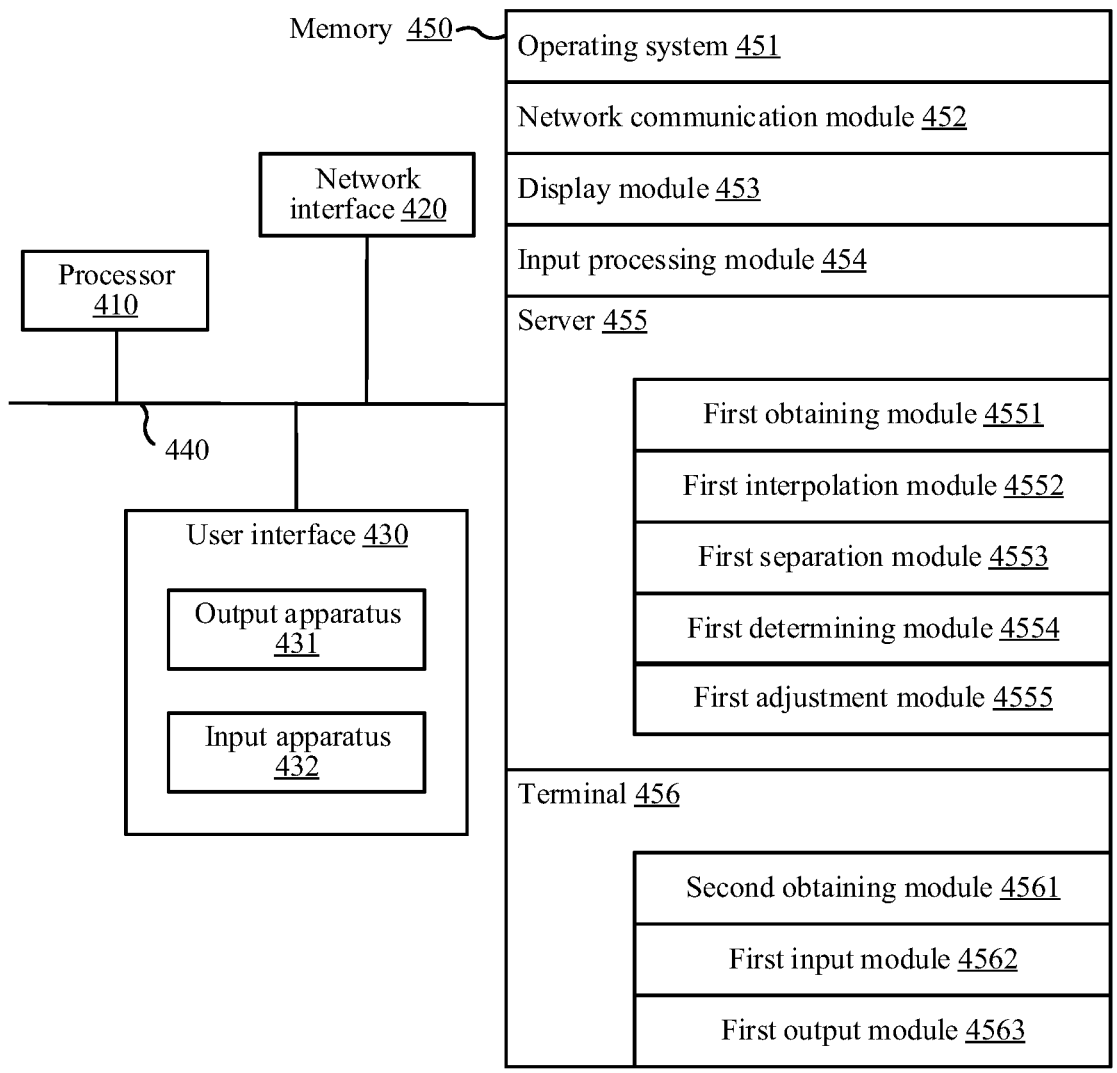
FIG. 2B is a diagram of a system for training an audio separation network according to an embodiment.

FIG. 2B is a diagram of a system for training an audio separation network according to an embodiment. The system includes at least one processor 410, a memory 450, at least one network interface 420, and a user interface 430. The components are coupled by using a bus system 440. The bus system 440 is configured to implement connection and communication between the components. In addition to a data bus, the bus system 440 further includes a power bus, a control bus, and a status signal bus. However, for clear description, various types of buses in the FIG. 2B are marked as the bus system 440.

The processor 410 may be an integrated circuit chip having a signal processing capability, for example, a general-purpose processor, a digital signal processor, or another programmable logic device, a discrete or transistor logic device, or a discrete hardware component, where the general-purpose processor may be a microprocessor, any conventional processor, or the like.

The user interface 430 includes one or more output apparatuses 431 that may display media content, including one or more loudspeakers and/or one or more visual display screens. The user interface 430 further includes one or more input apparatuses 432, including a user interface component helping a user input, for example, a keyboard, a mouse, a microphone, a touch display screen, a camera, or another input button and control.

The memory 450 may be a removable memory, a non-removable memory, or a combination thereof. Exemplary hardware devices include a solid-state memory, a hard disk drive, an optical disc driver, or the like. The memory 450 optionally includes one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this disclosure is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication, a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the apparatus provided in this embodiment of this disclosure may be implemented by using software. FIG. 2B shows a server 455 for training an audio separation network stored on the memory 450. The server 455 may be software in a form such as a program and a plug-in, and includes the following software modules: a first obtaining module 4551, a first interpolation module 4552, a first separation module 4553, a first determining module 4554, and a first adjustment module 4555. A terminal 456 for data recovery stored on the memory 450 may be software in a form such as a program and a plug-in, and includes the following software modules: a second obtaining module 4561, a first input module 4562, and a first output module 4563. These modules are logical modules, and may be randomly combined or further divided based on a function to be performed. The following describes functions of the modules.

In some other embodiments, the apparatus provided in this embodiment of this disclosure may be implemented by using hardware. For example, the apparatus provided in this embodiment of this disclosure may be a processor in a form of a hardware decoding processor, programmed to perform the method for training an audio separation network provided in the embodiments of this disclosure. For example, the processor in the form of a hardware decoding processor may use one or more application-specific integrated circuits (ASIC), a digital signal processor (DSP), a programmable logic device (PLD), a complex programmable logic device (CPLD), a field-programmable gate array (FPGA), or other electronic components.

To better understand the method provided in the embodiments of this disclosure, artificial intelligence (AI), various branches of AI, and an application field related to the method provided in the embodiments of this disclosure are first described.

AI is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that may respond in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes technologies such as sensors, dedicated AI chips, cloud computing, distributed storage, big data processing technologies, operating/interaction systems, and mechatronics. An AI software technology mainly includes fields such as a computer vision (CV) technology, a speech processing technology, a natural language processing technology, and machine learning (ML)/deep learning (DL). The fields are respectively described below.

CV in the CV technology is a science that studies how to use a machine to "see", and furthermore, is machine vision in which a camera and a computer are used for replacing human eyes to perform recognition, tracking, and measurement, and the like on a target, and further perform graphics processing, such that the computer processes the target into an image more suitable for human eyes to observe or an image transmitted to an instrument for detection. As a scientific subject, the CV studies related theories and technologies and attempts to establish an AI system that may obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Key technologies of the speech technology include an ASR technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

Natural language processing (NLP) is an important direction in the field of computer technologies and the field of AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

ML is a multi-field interdisciplinary subject involving the probability theory, statistics, the approximation theory, convex analysis, the algorithm complexity theory, and the like. ML specializes in studying how a computer simulates or implements a human learning behavior to obtain new knowledge or skills, and reorganize an existing knowledge structure to keep improving its performance. ML is a core of the AI, is a basic way to make the computer intelligent, and is applied to various fields of the AI. ML and DL usually include technologies such as artificial neural network, belief network, reinforcement learning, transfer learning, and inductive learning.

Autonomous driving technologies usually include high-precision maps, environment perception, behavior decision-making, path planning, motion control, and other technologies. Self-determined driving technology has a wide range of application prospects.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this disclosure relate to technologies such as NLP of AI, which are specifically described by using the following embodiments.

Figure 3:
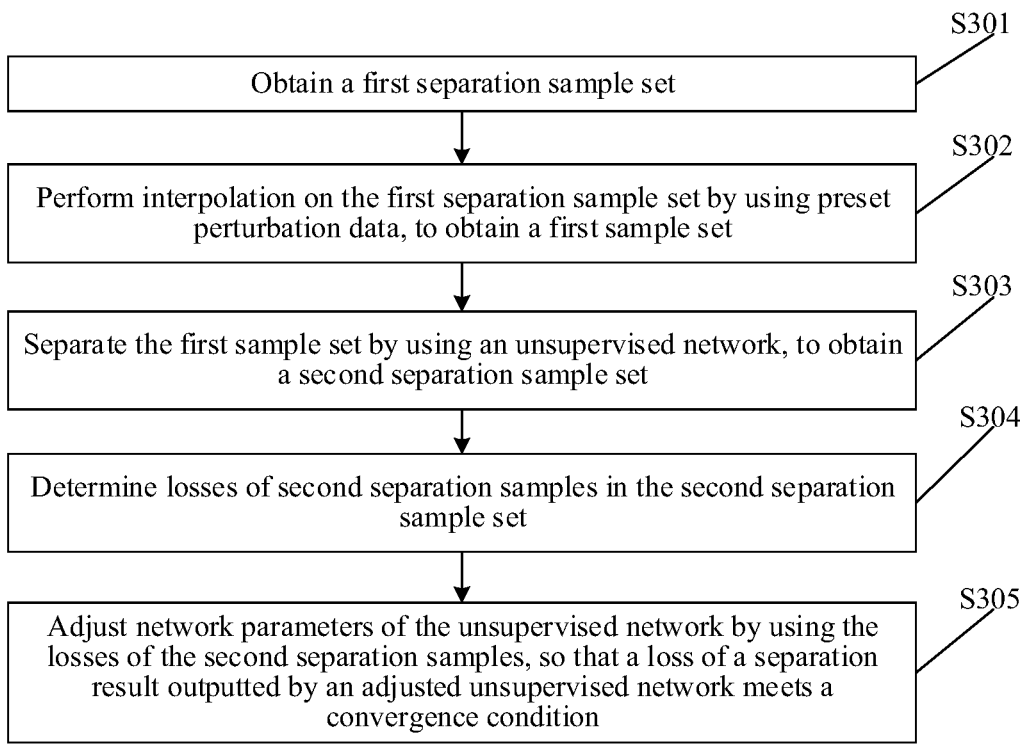
FIG. 3 is a flowchart of a method for training an audio separation network according to an embodiment.

FIG. 3 is a flowchart of a method for training an audio separation network according to an embodiment. An implementation procedure of the method for training an audio separation network may be implemented by using a device for training an audio separation network, and is described with reference to steps shown in FIG. 3.

In operation S301, the system obtains a first separation sample set.

In some embodiments, the first separation sample set at least includes two types of audio with dummy labels, for example, clean speech signals and interference signals with the dummy labels. In operation S301, the obtaining a first separation sample set may be that the first separation sample set is generated through simulation, or unlabeled audio data is separated by using a trained network, to obtain the first separation sample set with the dummy labels.

In operation S302, the system performs interpolation on the first separation sample set by using perturbation data, to obtain a first sample set.

In some embodiments, interpolation is respectively performed on each first separation sample by using different perturbation data, and then interpolated data is mixed, to obtain the first sample set. For example, the first separation sample set includes three first separation samples, the first separation samples are respectively adjusted by using three different perturbation data, and adjustment results are summed, thereby realizing interpolation and mixing on the first separation sample set and obtaining the first sample set.

In operation S303, the system separates the first sample set by using an unsupervised network, to obtain a second separation sample set.

In some embodiments, the unsupervised network may be any type of student network used for separating audio data. The first sample set is inputted into the unsupervised network, to obtain a plurality of second separation samples predicted and separated by the unsupervised network. In a specific example, the first sample set in which the speech signals and the interference signals are mixed is inputted into the unsupervised network, to obtain predicted and separated speech signals and interference signals.

In operation S304, the system determines losses of second separation samples in the second separation sample set.

In some embodiments, a loss between each second separation sample and true value data of the first separation sample set is determined, and a loss of each second separation sample is obtained, namely, a difference between each second separation sample and each first separation sample is determined.

In operation S305, the system adjusts network parameters of the unsupervised network by using the losses of the second separation samples, such that a loss of a separation result outputted by an adjusted unsupervised network meets a convergence condition.

In some embodiments, the loss of each second separation sample is respectively determined, a minimum loss is selected from these losses, and the network parameters of the unsupervised network are adjusted by using the minimum loss. After the adjustment, the unsupervised network including the adjusted network parameters are continuously trained until the loss of the separation result outputted by the unsupervised network meets the convergence condition, namely, a trained unsupervised network is obtained, which shows that the separation result outputted by the trained unsupervised network is relatively correct. The convergence condition of the loss of the separation result outputted by the adjusted unsupervised network may be understood that, the loss of the separation result outputted by the adjusted unsupervised network ultimately remains unchanged, or the loss is less than a specific threshold, that is, the separation result outputted by the adjusted unsupervised network is the same as the true value data, a similarity thereof is greater than 99%, or the like.

In this embodiment of this disclosure, first, mixed interpolation is performed on a first separation sample set including two types of audio with dummy labels. For example, the dummy labels may be understood as a separation result obtained after a teacher network is used for separation, namely, a result that preliminary separation is performed on samples by using the teacher network. Then, an unsupervised network is trained by using the mixed and interpolated first sample set, to obtain a separation result, namely, a second separation sample set. Finally, network parameters of the unsupervised network are adjusted by using losses of second separation samples, such that a loss of a separation result outputted by an adjusted unsupervised network meets a convergence condition. In this way, during training the unsupervised network, the first sample set on which interpolation is performed by using the two types of audio with the dummy labels and perturbation data is used as a training data set, which enriches the sample data of the unsupervised network and enhances the generalization capability of the unsupervised network.

In some embodiments, to improve the generalization capability of the unsupervised network, operation S301 may be implemented in the following two manners:

Manner 1: A plurality of audio with dummy labels are generated in a manner of simulation, namely, the first separation sample set is obtained.

Manner 2: Sample audio at least including unlabeled audio is obtained.

For example, obtained unlabeled audio data is used as the sample audio. The sample audio may be obtained as follows Audio data is collected in any scenario to obtain sample audio. For example, the system collects audio data in a chat scenario, or the system receives audio data sent by another device as sample audio, for example, audio data of a clip of music sent by another device.

Then, the sample audio is separated according to types of audio data by using a trained supervised network, and separation samples of each type are obtained, to obtain the first separation sample set.

In some possible implementations, the supervised network may be obtained in the following process. First, the system may obtain labeled clean sample audio and noise sample audio. In some embodiments, the labeled clean sample audio and noise sample audio may be obtained in the following manners: manually label clean sample audio and noise sample audio in the sample audio, such that the labeled clean sample audio and noise sample audio may be obtained. Alternatively, the system may randomly select a part of labeled clean sample audio and noise sample audio from a sample audio library.

Then, the system may mix the clean sample audio and the noise sample audio, to obtain a third sample set. For example, the clean sample audio and the noise sample audio are superimposed to obtain the mixed third sample set. Further, the system may separate the third sample set by using a to-be-trained supervised network, to obtain a fifth separation sample set. For example, the third sample set is inputted into the to-be-trained supervised network for prediction and separation, to obtain a separation result, namely, the fifth separation sample set. Further, the system may determine losses of fifth separation samples in the fifth separation sample set, that is, determine losses between the fifth separation samples and the labeled clean sample audio and noise sample audio. Finally, the system may adjust network parameters of the to-be-trained supervised network by using the losses of the fifth separation samples, such that a loss of a separation result outputted by the adjusted to-be-trained supervised network meets the convergence condition, to obtain a trained supervised network. For example, a loss between each fifth separation sample and any true value is determined, a minimum loss is selected from these losses and is used for adjusting the network parameters of the to-be-trained supervised network, to obtain the trained supervised network.

In some embodiments, network parameters of the supervised network are updated based on the network parameters of the unsupervised network. For example, the network parameters of the supervised network are obtained by performing EMA on the network parameters of the unsupervised network. The trained supervised network may be a teacher network. Types of audio data at least include: speech signals, noise signals, music signals, or other interference signals. Sample audio including a plurality of audio types is inputted into the trained supervised network, and the supervised network separates the sample audio, to obtain a separation result of each type with dummy labels, namely, the first separation sample set. In this way, unlabeled sample audio is predicted and separated by using the supervised network, and then a result of prediction and separation is used as sample audio of the to-be-trained unsupervised network, thereby enriching the sample data and improving the generalization capability of the unsupervised network.

In some embodiments, to enrich the sample data of the unsupervised network, operation S302 may be implemented as follows:

The system may multiply each first separation sample by different perturbation data in a one-to-one manner, to obtain an adjusted data set.

In some embodiments, different first separation samples are multiplied by different perturbation data. For example, the first separation sample set includes two first separation samples, perturbation data A is multiplied by one of the first separation samples, and perturbation data B (or 1-A) is multiplied by another first separation sample. In this embodiment of this disclosure, it is not limited to adjusting amplitudes of the first separation samples, and frequencies or speech rates of the first separation samples may alternatively be adjusted, to obtain the adjusted data set.

The system may perform summation on adjusted data in the adjusted data set, to obtain the first sample set. In some embodiments, summation is performed on the adjusted data in the adjusted data set, to obtain mixed audio data, namely, the first sample set.

In this embodiment of this disclosure, interpolation and mixing are performed on a plurality of first separation sample sets, thereby enriching the sample data for training the unsupervised network and enhancing the generalization capability of the trained unsupervised network.

In some embodiments, the network parameters of the supervised network are updated based on the network parameters of the unsupervised network, such that both the supervised network and the unsupervised network are trained a plurality of times, such that the finally trained unsupervised network has higher separation correctness. Operation S305 may be implemented in the following steps.

Figure 4A:
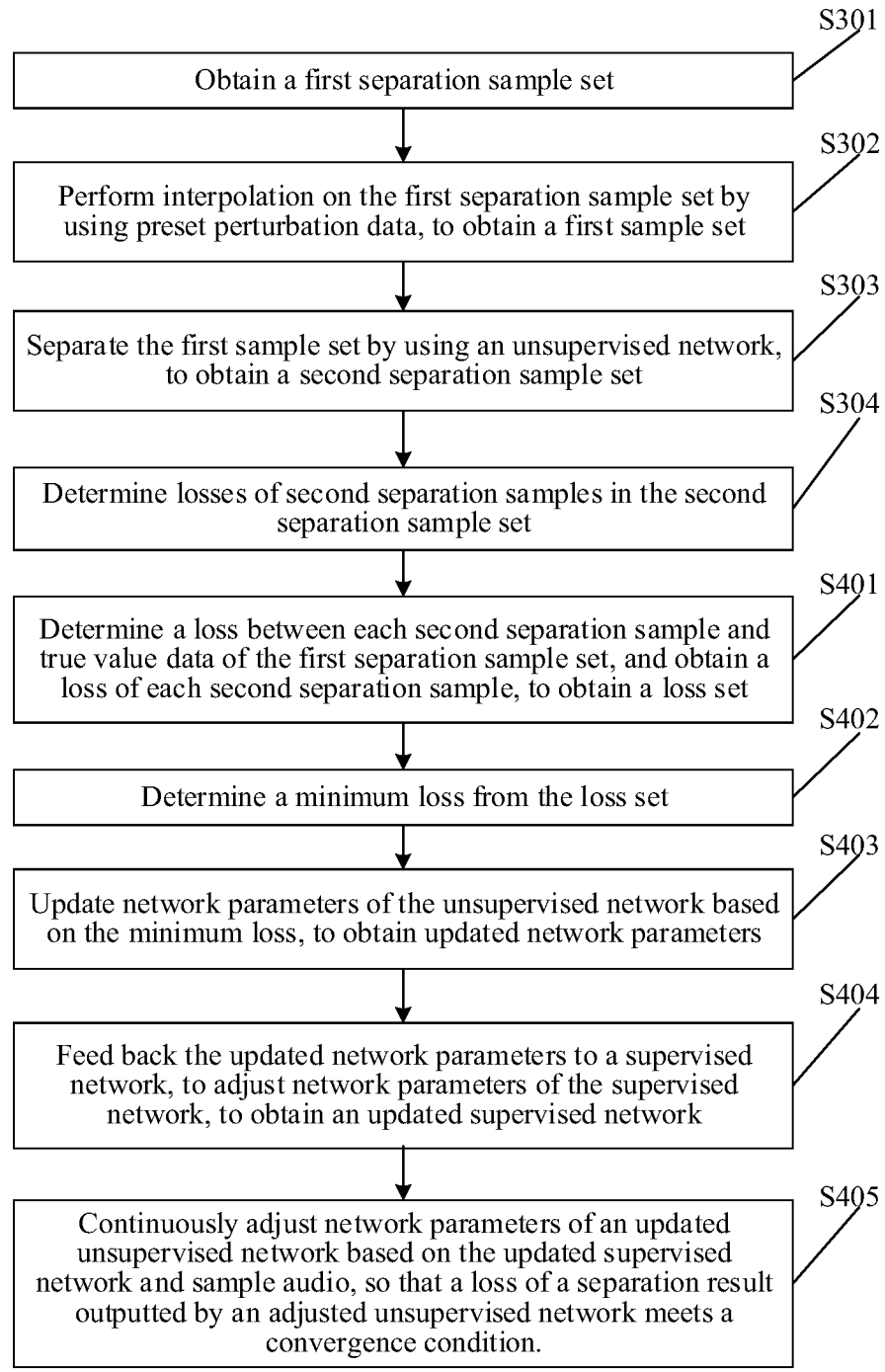
FIG. 4A is a flowchart of a method for training an audio separation network according to an embodiment.

FIG. 4A is a flowchart of a method for training an audio separation network according to an embodiment. The method may be implemented through a device for training an audio separation network, and is described below based on FIG. 3:

In operation S401, the system determines a loss between each second separation sample and true value data of the first separation sample set, and obtains a loss of each second separation sample, to obtain a loss set.

In some embodiments, the loss between each second separation sample and true value data of the first separation sample set is respectively determined, to obtain the loss set.

In operation S402, the system determines a minimum loss from the loss set.

In some embodiments, the minimum loss shows that a difference between the second separation sample and the true value data is smallest, which shows that the second separation sample has higher correctness.

In operation S403, the system updates the network parameters of the unsupervised network based on the minimum loss, to obtain updated network parameters.

In some embodiments, the minimum loss is fed back to the unsupervised network, to adjust the network parameters of the unsupervised network. For example, a weight value of a convolutional operation on the unsupervised network or structural parameters of a channel are adjusted, to obtain the updated network parameters. After operation S403, namely, after the updated network parameters are obtained, the updated network parameters are fed back to the supervised network, to update network parameters of the supervised network, namely, enter operation S404.

In operation S404, the system feeds back the updated network parameters to the supervised network, to adjust the network parameters of the supervised network, to obtain an updated supervised network.

In operation S405, the system continuously adjusts network parameters of the updated unsupervised network based on the updated supervised network and the sample audio, such that a loss of a separation result outputted by an adjusted unsupervised network meets a convergence condition.

In some possible implementations, the network parameters of the supervised network are updated by using EMA of the network parameters of the unsupervised network. That is, moving average values of the updated network parameters are first determined; and then, the moving average values are fed back to the supervised network, to adjust the network parameters of the supervised network, to obtain the updated supervised network. For example, the moving average values are used as the network parameters of the supervised network, to obtain the updated supervised network.

In this embodiment of this disclosure, the network parameters of the unsupervised network are adjusted by using the minimum loss, and the EMA is performed on the updated network parameters of the unsupervised network, to obtain the updated supervised network, such that both the supervised network and the unsupervised network are trained a plurality of times, such that the finally trained unsupervised network has the higher separation correctness.

In some embodiments, after both the network parameters of the unsupervised network and the network parameters of the supervised network are updated, the updated supervised network is continuously used for predicting and separating the sample audio, to facilitate continuous training on the updated unsupervised network, thereby obtaining the trained unsupervised network. After operation S404, the method further includes the following steps:

The system may separate the sample audio again by using the updated supervised network, to obtain a third separation sample set.

In some embodiments, the sample audio is inputted in the updated supervised network again, and the updated supervised network separates the sample audio again according to the audio types, to obtain the third separation sample set with the dummy labels. For example, sample audio including unlabeled clean speech signals and unlabeled interference signals is inputted in the updated supervised network, to obtain clean speech signals with the dummy labels and interference signals with the dummy labels.

The system may perform interpolation on the third separation sample set by using perturbation data, to obtain a second sample set, and input the second sample set into the updated unsupervised network.

In some embodiments, mixed interpolation is performed on the third separation sample set by using the perturbation data, thereby mixing the third separation sample set, to obtain the second sample set; and the second sample set is used as samples for training the unsupervised network, and is inputted into the updated unsupervised network. For example, mixed interpolation is performed on the clean speech signals with the dummy labels and the interference signals with the dummy labels, to obtain the second sample set.

The system may perform prediction and separation on the second sample set again by using the updated unsupervised network, to obtain a fourth separation sample set.

In some embodiments, prediction and separation are performed on the second sample set again by using the updated unsupervised network, to obtain a predicted separation result, namely, the fourth separation sample set.

The system may determine losses of fourth separation samples in the fourth separation sample set.

In some embodiments, losses between the fourth separation samples and the sample audio are determined, that is, differences between the fourth separation samples and the sample audio are determined.

The system may adjust the network parameters of the updated unsupervised network and the network parameters of the updated supervised network by using the losses of the fourth separation samples, such that a loss of a separation result outputted by the adjusted updated unsupervised network meets the convergence condition.

In some embodiments, a loss between each fourth separation sample and the true value data is first determined, and the network parameters of the unsupervised network are adjusted based on a minimum loss, such that the loss of the separation result outputted by the adjusted unsupervised network meets the convergence condition, thereby obtaining the trained unsupervised network.

In this embodiment of this disclosure, unlabeled sample audio is separated by using the supervised network (for example, a teacher network), and an estimated separation result is weighted and "mixed" to obtain more useful dummy-labeled input-output sample pairs (i.e., the first sample set). The unsupervised network is trained based on the dummy-labeled input-output sample pairs (for example, a student network), to achieve training for the student network in a semi-supervised manner, such that a separation result outputted by the trained student network is more correct.

Figure 4B:
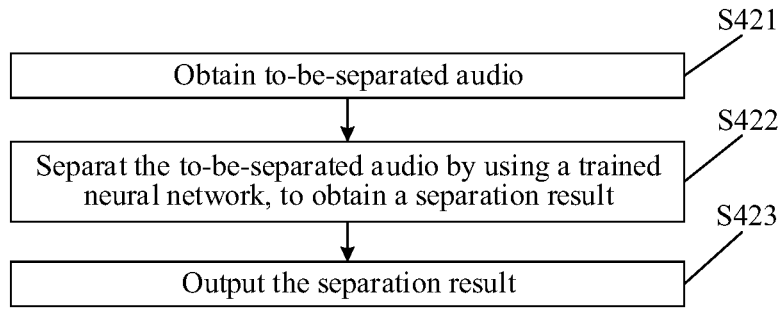
FIG. 4B is a flowchart of an audio separation method according to an embodiment.

FIG. 4B is a flowchart of an audio separation method according to an embodiment. This embodiment of this disclosure provides an audio separation method, and the method may be implemented through an audio separation device, and is described below in detail with reference to FIG. 4B.

In operation S421, the system obtains to-be-separated audio.

In some embodiments, the to-be-separated audio may include any type of audio signal in any scenario, for example, speech in an indoor chat scenario within a period of time, audio in an outdoor environment within a period of time, a piece of music played, or the like. In some possible implementations, the to-be-separated audio may be audio data actively collected by an audio separation device, or received audio data sent by another device, for example, a segment of speech in an indoor chat scenario collected by an audio collection apparatus in an audio separation device, or a segment of audio data of a video in a TV play sent by another device.

In operation S422, the system separates the to-be-separated audio by using a trained neural network, to obtain a separation result.

In some embodiments, the neural network is obtained based on the method for training an audio separation network, that is, the trained neural network performs interpolation on a first separation sample set including two types of audio with dummy labels, to obtain a first sample set. The first sample set is inputted into the neural network, to obtain a separation result of preset separation, namely, a second separation sample set. Network parameters of the neural network are adjusted by using losses of second separation samples, such that a loss of a separation result outputted by an adjusted neural network meets a convergence condition, namely, the trained neural network is obtained. The to-be-separated audio is separated by using the neural network obtained in this training manner. Regardless of whether a scenario corresponding to the to-be-separated audio matches a scenario corresponding to training sample data, the to-be-separated audio may be correctly separated into various types of separation results. For example, the to-be-separated audio is an audio collected indoors for a multi-person chat, and the audio includes speech signals and indoor noise signals. The to-be-separated audio is inputted into the trained neural network obtained in this training manner, and two types of signals: clean speech signals and noise signals, may be obtained, namely, correct separation results are obtained. In a process of separating the to-be-separated audio by using the trained neural network, first, a supervised network in the network is used for separating the to-be-separated audio according to types of audio data to obtain a candidate separation result of each type, to obtain a separation result set; then, difference calculation is performed on the separation result set by using perturbation data, to obtain a difference result set; further, the difference result set is separated by using a trained unsupervised network, to obtain a final separation result; and finally, enter operation S423.

In operation S423, the system outputs the separation result.

In this embodiment of this disclosure, interpolation is performed on a first separation sample set including two types of audio with dummy labels, to obtain a mixed first sample set; and then, an unsupervised network is trained based on the first sample set, such that network parameters of the unsupervised network are adjusted based on losses of second separation samples, such that a loss of a separation result outputted by an adjusted unsupervised network meets a convergence condition. In this way, interpolation is performed on the two types of audio with the dummy labels by using perturbation data, to obtain the first sample set. In this way, the first sample set is used as samples for training the unsupervised network, which enriches the sample data of the unsupervised network and enhances the generalization capability of the unsupervised network. In this way, when to-be-separated audio needs to be separated, the to-be-separated audio is inputted into the neural network obtained in this training manner, and a separation result with higher correctness may be obtained.

The following describes an exemplary application of this embodiment of this disclosure in an actual application scenario. An example in which mixed audio is separated is used for description.

This embodiment of this disclosure provides a new-type, effective, and easy-to-implement consistency-based semi-supervised learning algorithm, namely, mixup-breakdown training (MBT) for a speech separation task. The MBT first introduces a MT network to predict a separation result of inputted mixed signals. The inputted mixed signals include labeled data and unlabeled data; then, random mixed interpolation is performed on these intermediate output results to obtain a first sample set including dummy labels; and finally, prediction consistency between a teacher network (for example, a supervised network) and a student network (for example, an unsupervised network) is optimized, to update the student network. In this embodiment of this disclosure, performance of an MBT network is verified on mixed speech data that has not been interfered, and a result shows that separation performance of the MBT is remarkable.

In this embodiment of this disclosure, according to standard setting of training of a speech separation task, clean speech signals s and interference signals e are mixed according to a signal-to-noise ratio (SNR) within a given range, to obtain an input x=s+e (where weighted representation of s and e are omitted herein according to the SNR), to form a labeled data set $D_L=\{x_i, y_i\}_{i=1}^{N_L}$ including $N_L$ pairs of input-output samples, where, y=(s, e) is labeled. In some embodiments, in addition to labeled data, more data is unlabeled data $D_U=\{x_j\}_{j=N_L+1}^{N=N_L+N_U}$ that is easy to obtain, reflects the real scene but has yet to be developed.

Figure 5A:
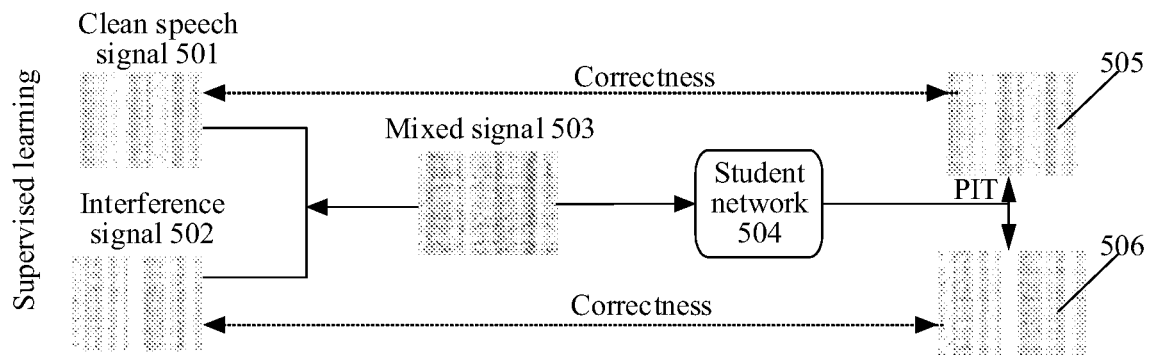
FIG. 5A is a flowchart of a method for training a supervised network according to an embodiment.

FIG. 5A is a flowchart of a method for training a supervised network according to an embodiment. The method is described below with reference to FIG. 5A.

In a supervised learning architecture shown in FIG. 5A, a speech separation network $f_\theta$ (i.e., a student network 504) and learning parameters θ of the network are given, and a target function $L(f_\theta(x), y)$ of the network usually reflects "correctness" of separation, which is defined as a difference between a predicted separation result $f_\theta(x)=(\hat{s}, \hat{e})$ and original clean speech data (i.e., labels) y=(s, e). In FIG. 5A, labeled clean speech signals 501 and interference signals 502 (namely, clean sample audio and noise sample audio) are mixed, to obtain labeled mixed signals 503 (namely, a third sample set). Then, the mixed signals 503 are used for training the student network 504, that is, the mixed signals 503 are inputted into the student network 504, a loss of each predicted separation result is determined, and a separation result with a minimum loss is used as a separation result with highest correctness, namely, separation results 505 and 506 respectively correspond to the clean speech signals 501 and the interference signals 502. Network parameters of the student network 504 are adjusted based on the minimum loss, to obtain a trained student network, and the trained student network is used as a teacher network 512 shown in FIG. 5B. For example, in an inventive example, a scale-invariant SNR (Si-SNR) and PIT are used for defining a loss function $L(f_\theta(x),y)$ of the trained student network, as shown in Equation (1):

$$L(f_\theta(x), y) = \min_{u \in \{\hat{s}, \hat{e}\}} \frac{\|\prod_s(u)\|_2^2}{\|u - \prod_s(u)\|_2^2} + \min_{v \in \{\hat{s}, \hat{e}\}} \frac{\|\prod_e(v)\|_2^2}{\|v - \prod_e(v)\|_2^2}. \quad (1)$$

In Equation (1), $\Pi_a(b)=a^T b/\|a\|_2^2 \cdot a$ represents a projection from b to a. u and v respectively represent any one type of the clean speech signals and the interference signals, and u and v are different.

In some embodiments, a proportional-invariant SNR and the loss function used in Equation (1) may be replaced with a loss function of another reconstruction type, such as a mean square error.

FIG. 5A shows a process of supervised learning. In FIG. 5A, assuming that input-output pairs conform to a joint distribution P (x, y) (where the distribution is usually unknown), and a target is to minimize an expected risk of the loss function on the distribution, so as to find an optimal solution of supervised network parameters θ*. The optimal solution is shown in Equation (2):

$$\theta^* = \underset{\theta}{\mathrm{argmin}} \int L(f_\theta(x), y) dP(x, y) \approx \quad (2)$$

$$\underset{\theta}{\mathrm{argmin}} \int L(f_\theta(x), y) dP_{emp}(x, y; D_L) =$$

$$\underset{\theta}{\operatorname{argmin}} \frac{1}{N_L} \sum_{i=1}^{N_L} L(f_\theta(x_i), y_i).$$

In Equation (2), $N_L$ represents a number of labeled sample data, $D_L$ represents labeled sample data, and $dP_{emp}(x, y, D_L)$ may be shown in Equation (3):

$$dP_{emp}(x, y; D_L) = \frac{1}{N_L} \sum_{i=1}^{N_L} \delta(x = x_i, y = y_i). \quad (3)$$

where $\delta(\cdot)$ represents a Dirac function $(x_i, y_i)$ centered on $\delta$. Based on this, $N_L$ labeled training samples may be used for estimating the expected risk. A complex neural network trained by using the manners provided in Equation (1) to (3) actually "memorizes" training data, rather than perform "generalization" by using the training data; in addition, a report shows that a network system that relies solely on this manner for training cannot cope with adversarial attacks, that is, samples that deviate slightly from a training data distribution may induce the system to give completely different failure predictions. Therefore, the network trained in this manner cannot generalize to test data that does not match a supervised training data set.

Based on this, this embodiment of this disclosure provides a method for training an audio separation network. Even when not heard, clean speech signals may still be separated and identified from mixed speech, and may maintain high-degree stability and consistency for various perturbations, such as an energy level, a speed of speech, static or moving, whether processing distortion, etc.

Figure 5B:
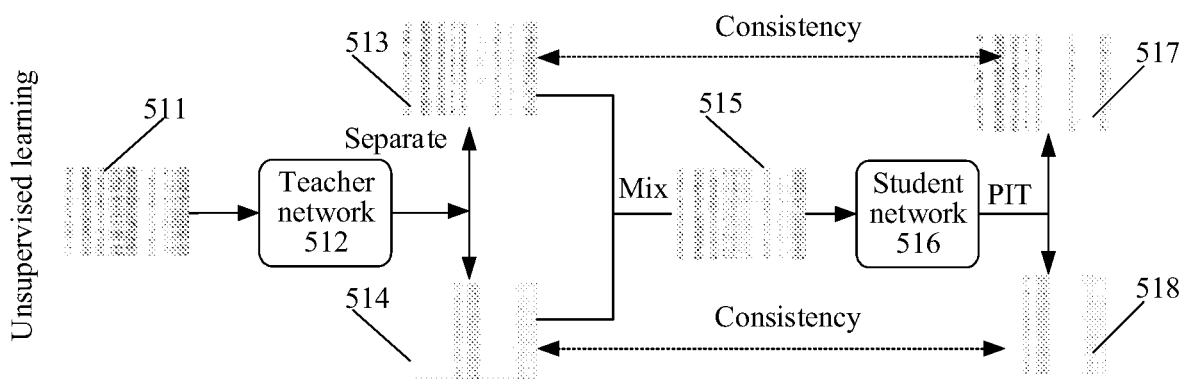
FIG. 5B is a flowchart of a method for training an unsupervised network according to an embodiment.

FIG. 5B is a flowchart of a method for training an unsupervised network according to an embodiment. FIG. 5B shows a process of unsupervised learning. A perturbation strategy is formed by performing interpolation and mixing on separation signals to promote consistent learning. In FIG. 5B, the trained student network obtained in FIG. 5A is used as a teacher network 512. First, mixed data 511 of unlabeled audio is inputted into the teacher network 512, to obtain two separation results, namely, predicted and separated interference signals 513 and clean speech signals 514. Then, interpolation is respectively performed on the interference signals 513 and the clean speech signals 514 by using preset interference data, to obtain mixed signals 515. Further, the mixed signals 515 are used as an input of an untrained student network 516, training is performed on the network, an output result with a minimum loss is selected from output results of the network, that is, output results 517 and 518, and the output results 517 and 518 respectively correspond to the predicted and separated interference signals 513 and clean speech signals 514 output by the teacher network 512. Finally, the student network 516 is adjusted based on the output results 517 and 518, such that a loss of a separation result outputted by an adjusted student network 516 meets a convergence condition. In this way, in FIG. 5B, the teacher network 512 is the trained network, and semi-supervised training is performed on the untrained student network 516 by using unlabeled data, so as to improve a generalization capability of the student network 516 obtained through final training. First, operations of mixing and separation in FIG. 5B are defined, as shown in Equations (4) and (5):

$$\operatorname{Mix}_\lambda(a,b) \stackrel{\Delta}{=} \lambda \cdot a + (1-\lambda) \cdot b \quad (4); \text{ and}$$

$$\operatorname{Break}_\lambda(a,b) \stackrel{\Delta}{=} (\lambda \cdot a, (1-\lambda) \cdot b) \quad (5).$$

where an interpolation weight $\lambda$ is set to conform to a Beta distribution, namely, $\lambda \sim \operatorname{Beta}(\alpha, \alpha)$, and $\alpha \in (0, \infty)$.

Then, an MBT strategy trains a student network $f_{\theta_S}$, and gives inputted mixed signals (which includes labeled and unlabeled signals), and consistency between prediction of the student network and perturbed prediction of a teacher network $f_{\theta_T}$ is encouraged through the following manners, as shown in Equation (6):

$$f_{\theta_S}(\operatorname{Mix}_\lambda(f_{\theta_T}(x_j))) \approx \operatorname{Break}_\lambda(f_{\theta_T}(x_j)) \quad (6).$$

where teacher network parameters $\theta_T$ are EMA values of student network parameters $\theta_S$. EMA is performed on multi-training steps of the student network parameters, which may obtain a more correct network, thereby accelerating a feedback loop between the student-teacher network.

In addition, this embodiment uses a mixed manner after adding perturbations into predicted separation results, which may construct more dummy-labeled input-output sample pairs. Because the dummy-labeled input-output sample pairs are closer to separation boundaries, consistency-based regularization training is more useful.

Under setting of semi-supervised learning, a total data set including labeled data $D_L$ and unlabeled data $D_U$ is given, and an audio separation network trained and optimized through MBT includes both correctness and consistency, as shown in Equation (7):

$$\theta_s^* \approx \underset{\theta_S}{\operatorname{argmin}} \left[ \frac{1}{N_L} \sum_{i=1}^{N_L} L(f_{\theta_S}(x_i), y_i) + \frac{r(t)}{N} \sum_{j=1}^{N} L(f_{\theta_S}(\operatorname{Mix}_\lambda(f_{\theta_T}(x_j))), \operatorname{Break}_\lambda(f_{\theta_T}(x_j))) \right]. \quad (7)$$

where $r(t)$ represents a ramp function, such that importance of a consistency optimization index in an overall optimization target is gradually increased as the training progresses.

The Equations (4) to (7) realize the training process of the audio separation network, that is, through the Equations (4) to (7), it may be realized that a trained audio separation network may be obtained under semi-supervised conditions. It can be seen from the Equation (7) that, in this embodiment of this disclosure, the network used for separating the to-be-separated audio may ensure the consistency of the separation result, and may also ensure the correctness of the separation result.

Data automatic online augmentation may be used for improving generalization performance of a supervised learning network. For example, in the field of image classification, image samples are expanded by shifting, zooming in, zooming out, rotating, flipping, etc. Similarly, in the field of speech recognition, speech training data is expanded by changing SNR, rhythm, a vocal cord length, or a speed. However, these expansions are performed based on labeled data. Based on an MBT method in this embodiment, the data automatic online augmentation is easy to realize, and an amount of additional calculation is very small, almost negligible. It can be seen from the Equation (7) that, the MBT may mine labeled data (i.e., $j \in \{1, \ldots, N_L\}$), or unlabeled data (i.e., $j \in \{N_L+1, \ldots, N\}$), to generate dummy-labeled input-output sample pairs, and expand an empirical distribution. Although examples given in this embodiment, as shown in the Equations (4) and (5), an effect of automatic data augmentation similar to different SNRs through amplitude interpolation is achieved. It is worth being noted that, the MBT strategy is not limited to this, and may be intuitively extended to an effect similar to another type of data automatic online augmentation, for example, speech speed, moving or static orientation (which includes a multi-microphone array, namely, a multi-channel scenario), algorithm distortion, etc. In a specific example, a network structure may use a Conv-TasNet structure, and further implements mixing with a relatively advanced semi-supervised manner, with MBT and interpolation consistency training (ICT) as reference systems for comparison. Attenuation coefficients used for constraining a degree of conservativeness in the MT network in all the semi-supervised methods are set to 0.999. In addition, the ramp function is set to $r(t)=\exp(t/T_{max}-1)$; and for $t \in \{1, \ldots, T_{max}\}$, $T_{max}=100$ represents a maximum number of iterations of training. In addition, $\alpha$ in an interpolation weight $\lambda \sim \text{Beta}(\alpha, \alpha)$ is set to 1, namely, 2 is evenly distributed in a range of [0,1].

In other embodiments, the network structure and specific parameters may alternatively be set with other parameters. A network type and a topology structure of a deep neural network are not specifically limited in this embodiment of this disclosure, and the deep neural network may be replaced with various other effective new network structures, for example, a network combining a long short-term memory (LSTM) network structure, a convolutional neural network (CNN) structure, and other network structures, or other network structures, such as a time delay network or a gated CNN. The topology structure of the network may be extended or simplified according to the limitation on network memory occupancy and a requirement on detection accuracy of the actual application.

Expansion is performed based on a speech standard training and test set (WSJ0) and a standard data set (WSJ0-2 mix) used for a speech separation task in an overview data set. Signals used as interference speech in WSJ0-2 mix are replaced with other types of interference sounds, to obtain the following mixed signal data set:

WSJ0-Libri: Use speech from another independent speech data set as the interference sounds.

WSJ0-music: Use music segments from a 43-hour music data set as the interference sounds, which cover varied classical and popular music genres.

WSJ0-noise: Use noise segments from a 4-hour noise data set as the interference sounds, which cover varied daily life scenarios, such as office spaces, restaurants, supermarkets, and construction sites. A plurality of data sets are divided into training sets, development sets, and test sets according to a ratio consistent with WSJ0-2 mix. These training sets may be used as unlabeled training sets for the following experiments.

First, corresponding to the effect of the data automatic online augmentation, results on a labeled data set of WSJ0-2 mix in this embodiment are shown in Table 1: a network scale in a deep attraction network is 9.1 Mbps (M), with an Si-SNR improvement (Si-SNRi) of 10.5; a network scale of an anchor deep attraction network is 9.1 M, with an Si-SNRi of 10.4 and an SDRi of 10.8; a network scale of an audio separation network with a bidirectional long and short memory time domain is 23.6 M, with an Si-SNRi of 13.2 and an SDRi of 13.6; and a network scale of an audio separation network with a convolutional time domain is 8.8 M, with an Si-SNRi of 15.3 and an SDRi of 15.6. In a case that the MBT network provided in this embodiment uses WSJ0-2 mix+ online data enhancement as a training data set, a network scale is 8.8M, with an Si-SNRi of 15.5 and an SDRi of 15.9; and in a case that the MBT network uses WSJ0-2 mix+ unlabeled WSJ0-multi as the training data set, a network scale is 8.8 M, with an Si-SNRi of 15.5. It can be seen from this that, MBT provided in this embodiment achieves the best Si-SNRi performance by a smallest network scale (8.8M), and both the Si-SNRi and the SDRi are highest.

TABLE 1

Performance comparison on WSJ0-2mix data set

| Method | Scale | Training data set | Si-SNRi | SDRi |
|---|---|---|---|---|
| Deep attraction network | 9.1 M | WSJ0-2mix | 10.5 | — |
| Anchor deep attraction network | 9.1 M | | 10.4 | 10.8 |
| Audio separation network with bidirectional long and short memory time domain | 23.6 M | | 13.2 | 13.6 |
| Audio separation network with convolutional time domain | 8.8 M | | 15.3 | 15.6 |
| MBT network | 8.8 M | WSJ0-2mix + online data enhancement | 15.5 | 15.9 |
| MBT network | 8.8 M | WSJ0-2mix + unlabeled WSJ0-multi | 15.6 | — |

Next, to verify generalization performance of MBT, performance of different systems under interference types not seen in the supervised learning process is compared in Tables 2, 3, and 4. It can be seen that, in all test environments, the MBT consistently exceeded reference systems. Particularly, in a music interference environment, the MBT has achieved an improvement of 13.77% relative to the SI-SNRi compared with an ICT method.

In addition, this embodiment of this disclosure further tested performance of the MBT semi-supervised learning method under a condition that no interference type is seen in a plurality of comprehensive fields. Therefore, unlabeled data sets WSJ0-Libri, WSJ0-noise, WSJ0-music are combined to form a data set (WSJ0-multi). WSJ0-multi is used as a multi-field unlabeled data set for semi-supervised training of the MBT, and then test sets of various fields are tested. Results are given in last rows of Tables 1, 2, 3, and 4 respectively.

It can be seen from Table 2 that, no matter which data set is used as the training data set, when tested speech does not match a speech type in training data, the MBT may be stored roughly the same, for example, an Si-SNRi is 13.75 on a training data set of WSJ0-2 mix; the Si-SNRi is 13.95 on a training data set of WSJ0-2 mix+unlabeled WSJ0-Libri; and the Si-SNRi is 13.88 on a training data set of WSJ0-2 mix +unlabeled WSJ0-multi.

TABLE 2

Separation performance of different training methods when speech does not match

| Method | Training data set | Training data set | Si-SNRi |
|---|---|---|---|
| Experience risk minimization | WSJ0-2mix | WSJ0-Libri | 13.56 |
| Mixing | | | 13.58 |
| MBT | | | 13.75 |
| Mean teacher | WSJ0-2mix + unlabeled WSJ0-Libri | | 13.81 |
| Interpolation consistency training | | | 13.78 |
| MBT | | | 13.95 |
| MBT | WSJ0-2mix + unlabeled WSJ0-multi | | 13.88 |

It can be seen from Table 3 that, no matter which data set is used as the training data set, when background noises do not match noise types in the training data set, the MBT may be stored roughly the same, for example, an Si-SNRi is 13.21 on a training data set of WSJ0-2 mix+unlabeled WSJ0-noise; and the Si-SNRi is 13.52 on a training data set of WSJ0-2 mix+unlabeled WSJ0-multi.

It can be seen from Table 4 that, no matter which data set is used as the training data set, when music does not match a music type in the training data set, the MBT may be stored roughly the same, for example, an Si-SNRi is 15.95 on a training data set of WSJ0-2 mix+unlabeled WSJ0-noise; and the Si-SNRi is 15.67 on a training data set of WSJ0-2 mix+unlabeled WSJ0-multi. It can be seen from Tables 2 to 4 that, the performance of MBT may be roughly maintained. Particularly, in Table 1 and Table 3, the Si-SNRi of MBT performance has been improved.

TABLE 3

Separation performance of different training methods when background noises do not match

| Method | Training data set | Training data set | Si-SNRi |
|---|---|---|---|
| Experience risk minimization | WSJ0-2mix | WSJ0-Libri | 1.86 |
| Mixing | | | 1.91 |
| MBT | | | 2.10 |
| MT | WSJ0-2mix + unlabeled WSJ0-noise | | 12.51 |
| ICT | | | 12.36 |
| MBT | | | 13.21 |
| MBT | WSJ0-2mix + unlabeled WSJ0-multi | | 13.52 |

TABLE 4

Separation performance of different training methods when music does not match

| Method | Training data set | Training data set | Si-SNRi |
|---|---|---|---|
| Experience risk minimization | WSJ0-2mix | WSJ0-music | 1.93 |
| Mixing | | | 1.94 |
| MBT | | | 1.99 |
| MT | WSJ0-2mix + unlabeled WSJ0-noise | | 14.12 |
| ICT | | | 14.02 |
| MBT | | | 15.95 |
| MBT | WSJ0-2mix + unlabeled WSJ0-multi | | 15.67 |

In the related art, especially in the semi-supervised learning method, ICT is an important expansion and improvement based on the MT network, which is mainly reflected in calculation of a consistency-based loss function $L_{ICT}$, as shown in Equation (8):

$$L_{ICT}=L(y_i,f_{\theta_s}(x_i))+r(t)C(x_j,y_k) \quad (8).$$

where $C(x_j, y_k)=\|f_{\theta_s}(Mix_\lambda(x_j, y_k))-Mix_\lambda(f_{\theta_T}(x_j), f_{\theta_T}(x_k))\|_2^2$, $(x_i, y_i)\sim D_L$, $(x_j, y_k)\sim D_U$, $D_L$ are labeled samples, and $D_U$ are unlabeled samples.

In some embodiments, samples used for "Mixing" are drawn directly and randomly from unlabeled data. In this embodiment of this disclosure, the ICT is applied to a speech separation task, and is used as an ablation experiment to verify meaning of a "Breakdown" process compared with the MBT.

From the above experimental comparison results, it can be seen that performance advantages brought by the MBT provided in this embodiment lie. In an application experiment, the MBT is tested for different scenarios where a degree of mismatch between training and testing is successively increased, including unseen interference speech, noises, and music, to reflect generalization performance of the method. In this embodiment, the generalization performance of the MBT is compared with the most advanced supervised method and the semi-supervised method. The results show that the MBT may achieve improvement of up to 13.77% relative to the Si-SNRi compared with the ICT, and also significantly and consistently exceeds several compared methods. In addition, the MBT provided in this embodiment requires a small amount of additional calculation based on a standard training solution.

The following continuously describes an exemplary structure that a server 455 for training an audio separation network provided in the embodiments of this disclosure is implemented as software modules. In some embodiments, as shown in FIG. 2B, the software modules stored in the server 455 for training an audio separation network in a memory 450 may include: a first obtaining module 4551, configured to obtain a first separation sample set, the first separation sample set at least including two types of audio with dummy labels; a first interpolation module 4552, configured to perform interpolation on the first separation sample set by using perturbation data, to obtain a first sample set; a first separation module 4553, configured to separate the first sample set by using an unsupervised network, to obtain a second separation sample set; a first determining module 4554, configured to determine losses of second separation samples in the second separation sample set; and a first adjustment module 4555, configured to adjust network parameters of the unsupervised network by using the losses of the second separation samples, such that a loss of a separation result outputted by an adjusted unsupervised network meets a convergence condition.

In some embodiments, the first determining module 4551 is further configured to: obtain sample audio at least including unlabeled audio; and separate the sample audio according to types of audio data by using a trained supervised network, and obtain separation samples of each type, to obtain the first separation sample set, where network parameters of the supervised network are updated based on the network parameters of the unsupervised network.

In some embodiments, the first interpolation module 4552 is further configured to: multiply each first separation sample by different perturbation data in a one-to-one manner, to obtain an adjusted data set; and perform summation on adjusted data in the adjusted data set, to obtain the first sample set.

In some embodiments, the first determining module 4554 is further configured to: determine a loss between each second separation sample and true value data of the first separation sample set, and obtain a loss of each second separation sample, to obtain a loss set; and the first adjustment module 4555 is further configured to determine a minimum loss from the loss set; and update the network parameters of the unsupervised network based on the minimum loss, to obtain updated network parameters.

In some embodiments, the first adjustment module 4555 is further configured to feed back the updated network parameters to the supervised network, to adjust the network parameters of the supervised network, to obtain an updated supervised network.

In some embodiments, the first adjustment module 4555 is further configured to: determine moving average values of the updated network parameters; and feed back the moving average values to the supervised network, to adjust the network parameters of the supervised network, to obtain the updated supervised network.

In some embodiments, the first adjustment module 4555 is further configured to: separate the sample audio again by using the updated supervised network, to obtain a third separation sample set; perform interpolation on the third separation sample set by using the perturbation data, to obtain a second sample set, and input the second sample set into an updated unsupervised network; perform prediction and separation on the second sample set again by using the updated unsupervised network, to obtain a fourth separation sample set; determine losses of fourth separation samples in the fourth separation sample set; and adjust network parameters of the updated unsupervised network and network parameters of the updated supervised network by using the losses of the fourth separation samples, such that a loss of a separation result outputted by the adjusted updated unsupervised network meets the convergence condition.

In some embodiments, the first separation module 4553 is further configured to: obtain labeled clean sample audio and noise sample audio; mix the clean sample audio and the noise sample audio, to obtain a third sample set; separate the third sample set by using a to-be-trained supervised network, to obtain a fifth separation sample set; determine losses of fifth separation samples in the fifth separation sample set; and adjust network parameters of the to-be-trained supervised network by using the losses of the fifth separation samples, such that a loss of a separation result outputted by the adjusted to-be-trained supervised network meets the convergence condition, to obtain a trained supervised network.

The following continuously describes an exemplary structure that an audio separation terminal 456 provided in the embodiments of this disclosure is implemented as software modules. In some embodiments, as shown in FIG. 2B, the software modules stored in the terminal 456 in the memory 450 may include: a second obtaining module 4561, configured to obtain to-be-separated audio; a first input module 4562, configured to separate the to-be-separated audio by using a trained neural network, to obtain a separation result, where the neural network is obtained through training based on the foregoing method for training an audio separation network; and a first output module 4563, configured to output the separation result. An embodiment of this disclosure provides a computer storage medium storing executable instructions. When the executable instructions are executed by a processor, the processor is caused to perform the audio separation method provided in the embodiments of this disclosure, or is caused to perform the method for training an audio separation network provided in the embodiments of this disclosure. In some embodiments, the storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a compact disc (CD) ROM (CD-ROM), or may be any terminal including one of or any combination of the foregoing memories. In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts). In an example, the executable instructions may be deployed to be executed on an in-vehicle computing terminal, or deployed to be executed on a plurality of computing terminals at the same location, or deployed to be executed on a plurality of computing terminals that are distributed in a plurality of locations and interconnected by using a communication network. In conclusion, in a process of training an audio separation network in the embodiments of this disclosure, first, interpolation is performed on a first separation sample set which includes two types of audio with dummy labels, such that a mixed first sample set is obtained; and then, an unsupervised network is trained based on the first sample set, such that network parameters of the unsupervised network are adjusted based on losses of second separation samples, such that a loss of a separation result outputted by an adjusted unsupervised network meets a convergence condition. In this way, during training an unsupervised network, a first sample set on which interpolation is performed by using two types of audio with dummy labels and perturbation data is used as samples for training the unsupervised network, which enriches sample data of the unsupervised network and enhances a generalization capability of the unsupervised network.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. A method of training an audio separation network, the method comprising:
obtaining a first separation sample set, the first separation sample set comprising at least two types of audio signals with dummy labels;
obtaining a first sample set by performing interpolation on the first separation sample set based on perturbation data;
obtaining a second separation sample set by separating the first sample set using an unsupervised network;
determining losses of second separation samples in the second separation sample set; and
adjusting network parameters of the unsupervised network based on the losses of the second separation samples, such that a first loss of a first separation result outputted by an adjusted unsupervised network meets a convergence condition,
wherein the determining the losses of the second separation samples in the second separation sample set comprises obtaining a loss set by:
determining a loss between each second separation sample and true value data of the first separation sample set; and
obtaining a loss of each second separation sample, and
wherein the adjusting the network parameters of the unsupervised network based on the losses of the second separation samples comprises obtaining updated network parameters by:
determining a minimum loss from the loss set; and
updating the network parameters of the unsupervised network based on the minimum loss.

2. The method of claim 1, wherein the performing interpolation on the first separation sample set based on the perturbation data comprises obtaining an adjusted data set by multiplying each first separation sample by different perturbation data in a one-to-one manner; and
wherein obtaining the first sample set comprises performing summation on adjusted data in the adjusted data set.

3. The method of claim 1, wherein the obtaining the first separation sample set comprises:
obtaining a sample audio signal comprising at least an unlabeled audio signal;
separating the sample audio signal according to types of audio signals using a trained supervised network, and obtaining separation samples of each type,
wherein network parameters of the trained supervised network are updated based on the network parameters of the unsupervised network.

4. The method of claim 3, wherein, before the separating the sample audio signal, and the obtaining separation samples of each type, the method further comprises:
obtaining a labeled clean sample audio signal and a noise sample audio signal;
obtaining a third sample set by mixing the labeled clean sample audio signal and the noise sample audio signal;
obtaining a fifth separation sample set by separating the third sample set using a to-be-trained supervised network;
determining losses of fifth separation samples in the fifth separation sample set; and
obtaining the trained supervised network by adjusting network parameters of the to-be-trained supervised network based on the losses of the fifth separation samples, such that a third loss of a third separation result outputted by an adjusted to-be-trained supervised network meets the convergence condition.

5. The method of claim 1, wherein, after the updating the network parameters of the unsupervised network based on the minimum loss, the method further comprises:
adjusting the network parameters of the trained supervised network by obtaining an updated supervised network by feeding back the updated network parameters to the trained supervised network.

6. The method of claim 5, wherein the feeding back the updated network parameters to the trained supervised network comprises determining moving average values of the updated network parameters,
wherein the obtaining the updated supervised network further comprises adjusting the network parameters of the trained supervised network by feeding back the moving average values to the trained supervised network.

7. The method of claim 6, wherein, after the feeding back the updated network parameters to the trained supervised network, the method further comprises:
obtaining a third separation sample set by separating the sample audio signal again by using the updated supervised network;
obtaining a second sample set by performing interpolation on the third separation sample set by using the perturbation data;
inputting the second sample set into an updated unsupervised network;
obtaining a fourth separation sample set by performing prediction and separation on the second sample set using the updated unsupervised network;
determining losses of fourth separation samples in the fourth separation sample set; and
adjusting the network parameters of the updated unsupervised network and the network parameters of the updated supervised network using the losses of the fourth separation samples, such that a second loss of a second separation result outputted by an adjusted updated unsupervised network meets the convergence condition.

8. An apparatus for training an audio separation network, the apparatus comprising:
at least one memory configured to store computer program code; and
at least one processor configured to access said computer program code and operate as instructed by said computer program code, said computer program code comprising:
first obtaining code configured to cause the at least one processor to obtain a first separation sample set, the first separation sample set comprising at least two types of audio signals with dummy labels;
second obtaining code configured to cause the at least one processor to obtain a first sample set by performing interpolation on the first separation sample set based on perturbation data;
third obtaining code configured to cause the at least one processor to obtain a second separation sample set by separating the first sample set using an unsupervised network;
first determining code configured to cause the at least one processor to determine losses of second separation samples in the second separation sample set; and
first adjusting code configured to cause the at least one processor to adjust network parameters of the unsupervised network based on the losses of the second separation samples, such that a first loss of a first separation result outputted by an adjusted unsupervised network meets a convergence condition, wherein the first determining code further causes the at least one processor to obtain a loss set by:
determining a loss between each second separation sample and true value data of the first separation sample set; and
obtaining a loss of each second separation sample, and wherein the first adjusting code is further configured to cause the at least one processor to obtain updated network parameters by:
determining a minimum loss from the loss set; and
updating the network parameters of the unsupervised network based on the minimum loss.

9. The apparatus of claim 8, wherein the performing interpolation on the first separation sample set based on the perturbation data comprises obtaining an adjusted data set by multiplying each first separation sample by different perturbation data in a one-to-one manner; and
wherein the second obtaining code is further configured to cause the at least one processor to obtain the first sample set by performing summation on adjusted data in the adjusted data set.

10. The apparatus of claim 8, wherein the first obtaining code further causes the at least one processor to:
obtain a sample audio signal comprising at least an unlabeled audio signal;
separate the sample audio signal according to types of audio signals using a trained supervised network, and obtain separation samples of each type,
wherein network parameters of the trained supervised network are updated based on the network parameters of the unsupervised network.

11. The apparatus of claim 10, wherein the computer program code further comprises, before the separating the sample audio signal, and the obtaining separation samples of each type:
seventh obtaining code configured to cause the at least one processor to obtain a labeled clean sample audio signal and a noise sample audio signal;
eighth obtaining code configured to cause the at least one processor to obtain a third sample set by mixing the labeled clean sample audio signal and the noise sample audio signal;
ninth obtaining code configured to cause the at least one processor to obtain a fifth separation sample set by separating the third sample set using a to-be-trained supervised network;
third determining code configured to cause the at least one processor to determine losses of fifth separation samples in the fifth separation sample set; and
tenth obtaining code configured to cause the at least one processor to obtain a trained supervised network by adjusting network parameters of the to-be-trained supervised network based on the losses of the fifth separation samples, such that a third loss of a third separation result outputted by an adjusted to-be-trained supervised network meets the convergence condition.

12. The apparatus of claim 8, wherein the computer program code further comprises second adjusting code configured to cause the at least one processor to, after the updating the network parameters of the unsupervised network based on the minimum loss, adjust the network parameters of the trained supervised network by obtaining an updated supervised network by feeding back the updated network parameters to the trained supervised network.

13. The apparatus of claim 12, wherein the feeding back the updated network parameters to the trained supervised network comprises determining moving average values of the updated network parameters; and wherein the obtaining the updated supervised network further comprises adjusting the network parameters of the trained supervised network by feeding back the moving average values to the trained supervised network.

14. The apparatus of claim 13, wherein the computer program code further comprises, after the feeding back the updated network parameters to the trained supervised network,
fourth obtaining code configured to cause the at least one processor to obtain a third separation sample set by separating the sample audio signal again by using the updated supervised network;
fifth obtaining code configured to cause the at least one processor to obtain a second sample set by performing interpolation on the third separation sample set by using the perturbation data;
first inputting code configured to cause the at least one processor to input the second sample set into an updated unsupervised network;
sixth obtaining code configured to cause the at least one processor to obtain a fourth separation sample set by performing prediction and separation on the second sample set using the updated unsupervised network;
second determining code configured to cause the at least one processor to determine losses of fourth separation samples in the fourth separation sample set; and
third adjusting code configured to cause the at least one processor to adjust the network parameters of the updated unsupervised network and the network parameters of the updated supervised network using the losses of the fourth separation samples, such that a second loss of a second separation result outputted by an adjusted updated unsupervised network meets the convergence condition.

15. A non-transitory computer-readable storage medium storing computer instructions that, when executed by at least one processor of a device, cause the at least one processor to:
obtain a first separation sample set, the first separation sample set comprising at least two types of audio signals with dummy labels;
obtain a first sample set by performing interpolation on the first separation sample set based on perturbation data;
obtain a second separation sample set by separating the first sample set using an unsupervised network;
determine losses of second separation samples in the second separation sample set; and
adjust network parameters of the unsupervised network based on the losses of the second separation samples, such that a first loss of a first separation result outputted by an adjusted unsupervised network meets a convergence condition,
wherein the computer instructions, when executed, further cause the at least one processor to determine the losses of the second separation samples in the second separation sample set by obtaining a loss set based on:
determining a loss between each second separation sample and true value data of the first separation sample set; and
obtaining a loss of each second separation sample; and
wherein the computer instructions, when executed, further cause the at least one processor to adjust the network parameters of the unsupervised network based on the losses of the second separation samples by obtaining updated network parameters based on:
determining a minimum loss from the loss set; and
updating the network parameters of the unsupervised network based on the minimum loss.

16. The storage medium of claim 15, wherein the computer instructions, when executed, further cause the at least one processor to obtain the first separation sample set by:
- obtaining a sample audio signal comprising at least an unlabeled audio signal;
- separating the sample audio signal according to types of audio signals using a trained supervised network, and obtaining separation samples of each type,
- wherein network parameters of the trained supervised network are updated based on the network parameters of the unsupervised network.

17. The storage medium of claim 15, wherein the performing interpolation on the first separation sample set based on the perturbation data comprises obtaining an adjusted data set by multiplying each first separation sample by different perturbation data in a one-to-one manner; and
- wherein the computer instructions, when executed, further cause the at least one processor to obtain the first sample set by performing summation on adjusted data in the adjusted data set.

\* \* \* \* \*